(12) United States Patent
Itoh et al.

(10) Patent No.: US 11,036,809 B2
(45) Date of Patent: Jun. 15, 2021

(54) TROUBLE INFORMATION SEARCH METHOD AND TROUBLE INFORMATION SEARCH APPARATUS

(71) Applicant: FUJITSU LIMITED, Kawasaki (JP)

(72) Inventors: Masayuki Itoh, Kawasaki (JP); Hajime Kubota, Kawasaki (JP); Hiroshi Kurosawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 15/974,189

(22) Filed: May 8, 2018

(65) Prior Publication Data
US 2018/0329901 A1 Nov. 15, 2018

(30) Foreign Application Priority Data

May 15, 2017 (JP) .............. JP2017-096859

(51) Int. Cl.
G06F 16/93 (2019.01)
G06N 20/00 (2019.01)
G06F 16/248 (2019.01)
G06F 16/2455 (2019.01)
G06F 11/00 (2006.01)
G06F 30/30 (2020.01)
G06F 111/20 (2020.01)

(52) U.S. Cl.
CPC .............. *G06F 16/93* (2019.01); *G06F 11/00* (2013.01); *G06F 16/248* (2019.01); *G06F 16/2455* (2019.01); *G06F 30/30* (2020.01); *G06N 20/00* (2019.01); *G06F 2111/20* (2020.01)

(58) Field of Classification Search
None
See application file for complete search history.

(56) References Cited

U.S. PATENT DOCUMENTS

| 2003/0195900 | A1  | 10/2003 | Nishigaki et al. |
|---|---|---|---|
| 2014/0324904 | A1  | 10/2014 | Yamamoto |
| 2017/0082680 | A1* | 3/2017  | Eck .................... G01R 31/2815 |
| 2017/0344909 | A1* | 11/2017 | Kurokawa ............... G06N 5/04 |
| 2019/0187679 | A1* | 6/2019  | Strudwicke .......... G05B 13/026 |

FOREIGN PATENT DOCUMENTS

| JP | 08-030670   | 2/1996 |
|---|---|---|
| JP | 2003-303213 | 10/2003 |
| JP | 2004-206308 | 7/2004 |
| JP | 2013-114484 A | 6/2013 |

OTHER PUBLICATIONS

Japanese Office Action dated Mar. 30, 2021 for corresponding Japanese Patent Application No. 2017-096859, with English Translation, 6 pages.

* cited by examiner

Primary Examiner — Giuseppi Giuliani
(74) Attorney, Agent, or Firm — Fujitsu Patent Center

(57) ABSTRACT

A trouble information search method includes, storing information on a circuit component, information on a use state of the circuit component, and trouble information on the circuit component, receiving input of information on a circuit component and information on a use state of the circuit component, identifying information on a trouble that has occurred with a circuit component having detailed information similar to detailed information on the circuit component and a circuit component for use in a state similar to a use state of the circuit component, and outputting information on the identified trouble.

19 Claims, 12 Drawing Sheets

FIG. 2

| CIRCUIT COMPONENT ID | REGISTRATION DATE | REGISTRANT | PRODUCT TYPE | MODEL CODE | MANUFACTURER | FREQUENCY | STABILITY | PACKAGE | ELECTRODE | ... | OUTER DIMENSIONS | ... |
|---|---|---|---|---|---|---|---|---|---|---|---|---|
| XXX1 | | | QUARTZ OSCILLATOR | ABCD1234 | O CORPORATION | 25 Mhz | ± 50 ppm | CERAMIC | Ni + Au | | | |
| XXX2 | | | IC | ... | ... | ... | ... | ... | ... | | | |
| XXX3 | | | ... | EFGH5678 | | | | | | | | |
| ... | | | ... | | | | | | | | | |
| XYZ1 | | | ... | efg567 | | | | | | | | |
| XYZ2 | | | ... | | | | | | | | | |
| ... | | | | | | | | | | | | |

FIG. 3

| CIRCUIT COMPONENT ID | DESIGN DESTINATION | ... | USE ENVIRONMENT | ... | VOLTAGE | ... |
|---|---|---|---|---|---|---|
| XXX1 | CIRCUIT COMPONENTS LIST A | | 50°C, HUMIDITY 50%, ΔT: 30°C | | 3.3 V | |
| XYZ2 | CIRCUIT COMPONENTS LIST A | | ... | | ... | |
| ... | | | ... | | | |
| ZZZ2 | IMPLEMENTATION DIAGRAM A | | ... | | ... | |
| ... | CIRCUIT COMPONENTS LIST B | | ... | | ... | |
| XYZ2 | | | | | | |

FIG. 4

| TROUBLE ID | CIRCUIT COMPONENT ID | TROUBLE CONTENTS | OCCURRENCE ENVIRONMENT | DETECTION METHOD | TROUBLE COUNTERMEASURES | SUBSTITUTE | ... |
|---|---|---|---|---|---|---|---|
| A001 | XXX1 | | | 85°C, 500 HOURS | TEMPERATURE RANGE IS FROM 0 TO 0°C | IJKL9000 | |
| ... | | | | | | | |

FIG. 5

| TROUBLE ID | CIRCUIT COMPONENT ID | TROUBLE CONTENTS | OCCURRENCE ENVIRONMENT | DETECTION METHOD | TROUBLE COUNTERMEASURES | SUBSTITUTE | ... |
|---|---|---|---|---|---|---|---|
| A001 | XYZ1 | OOO | | -40°C TO 85°C, 100 CYCLES | | ijk000 | |
| ... | | | | | | | |

FIG. 9

| CIRCUIT COMPONENT NAME | NUMBER OF PIECES | MODEL CODE, ETC. |
|---|---|---|
| LED | 3 | |
| VARIABLE RESISTOR | 1 | 10 k |
| CAPACITOR (WITHSTAND VOLTAGE 1000V) | 1 | 0.1 u |
| DIODE | 1 | 1N4007 |
| RESISTOR | 1 | 1 k |
| RESISTOR | 1 | 10 k |
| RESISTOR | 1 | 20 k |
| TEST PIN | 3 | |
| PIN SOCKET (FEMALE) | 4 | |
| PIN SOCKET (MALE) | 2 | |
| QUARTZ OSCILLATOR | | ABCD1234 |
| IC | | |

TROUBLE INFORMATION SEARCH METHOD AND TROUBLE INFORMATION SEARCH APPARATUS

CROSS-REFERENCE TO RELATED APPLICATION

This application is based upon and claims the benefit of priority of the prior Japanese Patent Application No. 2017-96859, filed on May 15, 2017, the entire contents of which are incorporated herein by reference.

FIELD

The embodiments discussed herein are related to a trouble information search program, a trouble information search method, and a trouble information search apparatus.

BACKGROUND

For example, a technique is known for extracting information on troubles that occurred in the past in accordance with an object specified in design work. In this technique, when a certain object, which is a circuit component in a design drawing, is specified, terms accompanying the object are extracted as primary terms, and secondary terms are identified by referring to a term database in which the related secondary terms are associated with the primary terms. The document search unit then extracts and displays information on the troubles that occurred in the past in association with the object from at least one of a trouble case database and a trouble document database using at least the secondary terms.

Also, a technique for searching and displaying a case of a past failure with a circuit component similar to a changed portion by a data analysis station is known. In this technique, a portion to be changed and failure phenomena that occurred in the past in association with the change of the changed portion are stored in a database. Also, the model names of devices, the circuit component structures classified for each module corresponding to the individual model names, and the names of the circuit components used in association with the respective circuit component structures are also stored in the database. In this technique, data accompanying a changed portion for each model is input, and at the point in time when data of the changed portion is input, a search is made whether there are similar failure cases that occurred in the past based on the input data and the database. If there are similar failure cases, the similar failure cases are individually displayed.

Related-art techniques are disclosed in Japanese Laid-open Patent Publication Nos. 2004-206308 and 8-30670.

SUMMARY

According to an aspect of an embodiment, a trouble information search method includes, storing information on a circuit component, information on a use state of the circuit component, and trouble information on the circuit component, receiving input of information on a circuit component and information on a use state of the circuit component, identifying information on a trouble that has occurred with a circuit component having detailed information similar to detailed information on the circuit component and a circuit component for use in a state similar to a use state of the circuit component, and outputting information on the identified trouble.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a circuit component information DB according to the first embodiment;

FIG. 3 is a diagram illustrating a circuit design information DB according to the first embodiment;

FIG. 4 is a diagram illustrating an example of a circuit component trouble information DB according to the first embodiment;

FIG. 5 is a diagram illustrating an example of a circuit design trouble information DB according to the first embodiment;

FIG. 9 is a diagram illustrating an example of a circuit components list;

DESCRIPTION OF EMBODIMENTS

Incidentally, even if a trouble occurs with the same device, that knowledge is not taken over when designers are changed, or even the same designer sometimes fails to make use of suitable knowledge from many troubles. In the techniques described above, the same trouble is sometimes repeated every time designers are changed, or even if the same trouble occurred in the past, a designer is sometimes unaware of the similarity. Accordingly, the same trouble is sometimes repeated without utilizing suitable knowledge.

Embodiments

In the following, a detailed description will be given of a trouble information search program, a trouble information search method, and a trouble information search apparatus according to embodiments of the present disclosure with reference to the drawings. In this regard, the present disclosure is not limited by the embodiments. Also, each of the embodiments described below may be suitably combined within a range that does not cause inconsistencies.

First Embodiment

Figure 1:
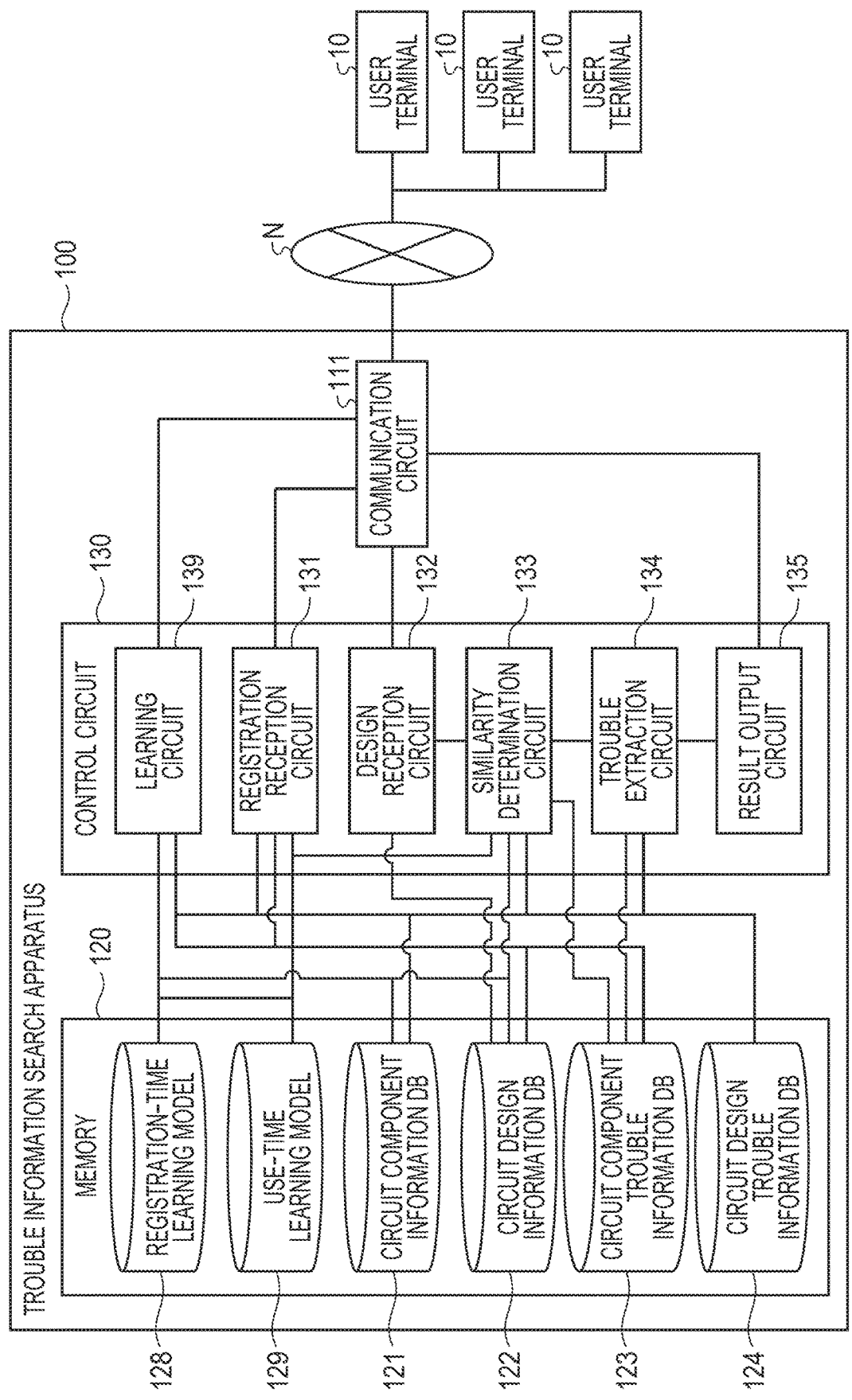
FIG. 1 is a diagram illustrating an example of a trouble information search system according to a first embodiment.

A description will be given of a trouble information search system according to the present embodiment with reference to FIG. 1. FIG. 1 is a diagram illustrating an example of a trouble information search system according to a first embodiment. The trouble information search system 1 illustrated in FIG. 1 includes a trouble information search apparatus 100 and a plurality of user terminals 10. In the present embodiment, the trouble information search apparatus 100 and the user terminals 10 are connected in a communicable manner via a wireless or wired network N. In this regard, the number of user terminals 10 in FIG. 1 is an example, and the trouble information search system 1 may have a configuration including any number of user terminals 10.

The user terminals 10 illustrated in FIG. 1 are used by circuit designers, or the like. The circuit designers register a new circuit component in the trouble information search apparatus 100 via the user terminals 10. Also, the circuit designers register information on the use state of the registered circuit component in the trouble information search apparatus 100 via the user terminals 10 at the time of designing a circuit. A use state refers to the use environment of a circuit component to be used for a device that is being developed by the circuit designers, and refers to operating temperature, humidity, an applied voltage, or the like. If it is difficult to obtain the use environment information of a circuit component, a use state refers to the use environment of the device.

The trouble information search apparatus 100 illustrated in FIG. 1 receives and registers information on a new circuit component from one of the user terminals 10. Also, the trouble information search apparatus 100 registers the use state of a circuit component at the time of circuit design, which is input from one of the user terminals 10.

Also, when the trouble information search apparatus 100 according to the present embodiment receives input of information on a circuit component from one of the user terminals 10, the trouble information search apparatus 100 identifies a circuit component having detailed information similar to that of the circuit component, and a circuit component used in a similar manner by machine learning. The trouble information search apparatus 100 then outputs information on a trouble that has occurred with the circuit component to the one of the user terminals 10. That is to say, the trouble information search apparatus 100 according to the present embodiment identifies a circuit component having the detailed information similar to that of a selected circuit component and a circuit component used in a similar manner by machine learning and outputs the information on the trouble that occurred with the circuit component. Accordingly, it is possible to make the trouble with a circuit component well known.

Functional Block

Next, a description will be given of the functional configuration of the trouble information search apparatus 100 according to the present embodiment with reference to FIG. 1. The trouble information search apparatus 100 includes a communication circuit 111, a memory 120, and a control circuit 130.

The communication circuit 111 controls communication with the other computers, or the like, such as the user terminals 10, or the like regardless of whether being connected wiredly or wirelessly. The communication circuit 111 is a communication interface, or the like, for example, a network interface card (NIC), or the like.

The memory 120 stores various kinds of data, or the like, for example, a program executed by the control circuit 130, or the like. Also, the memory 120 includes a circuit component information DB121, a circuit design information DB122, a circuit component trouble information DB123, a circuit design trouble information DB124, a registration-time learning model 128, and a use-time learning model 129. The memory 120 corresponds to a semiconductor memory device, such as a random access memory (RAM), a read only memory (ROM), a flash memory, or the like, or a memory device, such as a hard disk drive (HDD), or the like.

The circuit component information DB121 stores information on a circuit component including the use state of the circuit component. FIG. 2 is a diagram illustrating an example of a circuit component information DB according to the first embodiment. As illustrated in FIG. 2, the circuit component information DB121 stores, for example, "circuit component ID", "registration date", "registrant", "product type", "model code", "manufacturer", "frequency", "stability", "package", "electrode", and "outer dimensions" in association with each other. The circuit component information DB121 according to the present embodiment stores one record for one circuit component. In this regard, the information stored in the circuit component information DB121 is input, for example, by a registration reception circuit 131 described later.

In FIG. 2, "circuit component ID" stores an identifier that uniquely identifies a circuit component. "Registration date" and "registrant" stores the date, month, and year when the circuit component is registered, and an identifier that identifies a user who registered the circuit component.

As illustrated in FIG. 2, the circuit component information DB121 stores "product type", "model code", and "manufacturer" of each circuit component, or the like. Further, the circuit component information DB121 stores the characteristics, such as "frequency", "stability", "package", "electrode", and "outer dimensions" of each circuit component, and the like. In this regard, the information stored in the circuit component information DB121 is an example. The circuit component information DB121 may further store the other information and may have a structure that does not store a circuit component of the information illustrated in FIG. 2.

Referring back to FIG. 1, the circuit design information DB122 stores the information on the use environment, or the like of each circuit component at design time. FIG. 3 is a diagram illustrating the circuit design information DB according to the first embodiment. As illustrated in FIG. 3, the circuit design information DB122 stores "design destination", "use environment", and "voltage" in association with "circuit component ID". In the present embodiment, in the case where the same circuit component is implemented in a different design, a different record is stored in the circuit design information DB122 for each design when the same circuit component is used. In this regard, the information stored in the circuit design information DB122 is input by a design reception circuit 132 described later.

In FIG. 3, "design destination" stores a design including a circuit component having the circuit component ID. The circuit design information DB122 stores information identifying a design destination, for example, documents on a design, such as a circuit components list, a circuit diagram, an implementation diagram, or the like. In the present embodiment, a circuit components list is a list in which the names of a plurality of circuit components, model codes, or the like are summarized. In FIG. 3, "use environment" and "voltage" store the information, such as environment in which a circuit component is used in the design destination, specifications, and the like. In this regard, the information stored in the circuit component information DB121 is an example. The other information may be further stored, and a portion of the information illustrated in FIG. 3 may not be stored.

Referring back to FIG. 1, the circuit component trouble information DB123 stores the information on a trouble derived peculiarly from the circuit component among the troubles that occurred in association with the circuit component regardless of a circuit design. FIG. 4 is a diagram illustrating an example of the circuit component trouble information DB according to the first embodiment. As illustrated in FIG. 4, the circuit component trouble information DB123 stores, for example, each item of "circuit component ID", "trouble contents", "occurrence environment", "detection method", "trouble countermeasures", and "substitute" in association with "trouble ID". In this regard, The information stored in the circuit component trouble information DB123 is input, for example, by the registration reception circuit 131 described later.

In FIG. 4, "trouble ID" is an identifier that uniquely identifies information on a trouble. "Trouble contents" and "occurrence environment" store information on a trouble that has occurred. In this regard, the other information, such as date and time when a trouble occurred, or the like may be further stored.

In FIG. 4, "detection method" stores a method for verifying whether or not a trouble occurs with a circuit component. "Trouble countermeasures" stores information on a use environment for avoiding a trouble, or the like. "Substitute" stores the model code, and the like of a substitute of the circuit component with which the trouble occurred. In this regard, the information stored in the circuit component trouble information DB123 is an example. The other information may be further stored, and a portion of the information illustrated in FIG. 4 may not be stored.

Referring back to FIG. 1, the circuit design trouble information DB124 stores the information on a trouble that is derived from a use environment among the troubles that occurred in association with the circuit component. FIG. 5 is a diagram illustrating an example of the circuit design trouble information DB according to the first embodiment. As illustrated in FIG. 5, the circuit design trouble information DB124 stores each item of, for example, "circuit component ID", "trouble contents", "occurrence environment", "detection method", "trouble countermeasures", and "substitute" in association with "trouble ID" in the same manner as the circuit component trouble information DB123. In this regard, the information stored in the circuit design trouble information DB124 is input by, for example, by the registration reception circuit 131 described later.

Referring back to FIG. 1, the registration-time learning model 128 stores a model for identifying a circuit component similar to the input circuit component in registration time processing described later. The registration-time learning model 128 is generated, for example, by publicly known machine learning using each item of the characteristics, the shape, the manufacturer, or the like of each circuit component. In this regard, the registration-time learning model 128 is registered or updated, for example, by a learning circuit 139 described later. Also, the registration-time learning model 128 may have a configuration, for example, in which an engineer registers an initial value or updates an initial value.

Next, the use-time learning model 129 stores a model for identifying a circuit component used in a use environment similar to the use environment of the input circuit component in design time processing described later. The use-time learning model 129 is generated, for example, by publicly known machine learning using each item on the circuit design destination, the use environment, the voltage, or the like of each circuit component. In this regard, the use-time learning model 129 is registered or updated, for example, by learning circuit 139 described later. Also, the use-time learning model 129 may have a configuration, for example, in which an engineer registers an initial value or updates an initial value.

Next, the control circuit 130 is a processing unit that performs the overall control of the trouble information search apparatus 100. The control circuit 130 is realized by, for example, execution of a program stored in an internal memory device by a central processing unit (CPU) or a micro processing unit (MPU), or the like using the RAM as a work area. Also, the control circuit 130 may be realized by, for example, an integrated circuit, such as an application specific integrated circuit (ASIC), a field programmable gate array (FPGA), or the like.

The control circuit 130 includes the registration reception circuit 131, a design reception circuit 132, a similarity determination circuit 133, a trouble extraction circuit 134, a result output circuit 135, and a learning circuit 139. In this regard, the registration reception circuit 131, the design reception circuit 132, the similarity determination circuit 133, the trouble extraction circuit 134, the result output circuit 135, and the learning circuit 139 are examples of the electronic circuits possessed by a processor or examples of the processes executed by a processor.

The registration reception circuit 131 receives information on registration of a circuit component and information on a trouble of a circuit component. The registration reception circuit 131 receives information on a circuit component to be newly registered, for example, from one of the user terminals 10 via the communication circuit 111. The registration reception circuit 131 registers the received information on the circuit component in the circuit component information DB121 and outputs the information on the circuit component to the similarity determination circuit 133. In this regard, the registration reception circuit 131 is an example of the reception circuit.

Also, the registration reception circuit 131 receives information on a trouble that has occurred with a circuit component, for example, from one of the user terminals 10 via the communication circuit 111. The registration reception circuit 131 determines whether the received information on a trouble is a trouble derived peculiarly from a circuit component or a trouble derived from a use environment. The registration reception circuit 131 stores the information on a trouble determined to have been derived peculiarly from a circuit component in the circuit component trouble information DB123 and stores the information on a trouble determined to have been derived from a use environment in the circuit design trouble information DB124.

Next, the design reception circuit 132 receives information on a design using the registered circuit component. The design reception circuit 132 receives, for example, the information on the circuit component used in the design and the information on the use state of the circuit component from one of the user terminals 10 via the communication circuit 111. The information on a circuit component is, for example, information on a model code, but is not limited to this. The information on a circuit component may be information on the specification of a circuit component, or the like. The design reception circuit 132 registers the information on the use state of the received circuit component in the circuit design information DB122 and outputs the information to the similarity determination circuit 133. In this regard, the design reception circuit 132 is an example of the reception circuit.

Next, the similarity determination circuit 133 extracts a circuit component similar to the newly registered circuit component and a circuit component used in a use state similar to the use state of the circuit component used in design. When the similarity determination circuit 133 receives input of the information on a circuit component from the registration reception circuit 131, the similarity determination circuit 133 refers to the circuit component information DB121 and the registration-time learning model 128, and extracts the information on a circuit component similar to the received input circuit component. The similarity determination circuit 133 then outputs the extracted information on the circuit component to the trouble extraction circuit 134. In this regard, the similarity determination circuit 133 is an example of the identification circuit.

Also, when the similarity determination circuit 133 receives input of the information on the use state of the circuit component from the design reception circuit 132, the similarity determination circuit 133 refers to the circuit design information DB122 and the use-time learning model 129, and extracts a circuit component used in a use state similar to the use state of the received input circuit component. The similarity determination circuit 133 then outputs the information on a circuit component used in a use state similar to the use state of the extracted circuit component to the trouble extraction circuit 134.

Next, the trouble extraction circuit 134 extracts a trouble with a circuit component similar to the extracted circuit component and a trouble with a circuit component used in a use state similar to the use state of the extracted circuit component. In this regard, the trouble extraction circuit 134 is an example of the identification circuit.

When the trouble extraction circuit 134 receives input of the information on a circuit component from the similarity determination circuit 133, the trouble extraction circuit 134 refers to the circuit component trouble information DB123 and determines whether or not there is information on troubles with the received input circuit component.

If the trouble extraction circuit 134 determines that there is information on a trouble, the trouble extraction circuit 134 outputs the information on the trouble with the circuit component extracted from the circuit component trouble information DB123 to the result output circuit 135. If the circuit component trouble information DB123 stores information on, for example, a trouble detection method, trouble countermeasures, a substitute, and the like, the trouble extraction circuit 134 extracts these pieces of information as the information on troubles. Also, if the trouble extraction circuit 134 determines that there is no information on troubles, the trouble extraction circuit 134 outputs information indicating that there are no hits of information on troubles to the result output circuit 135.

Also, when the trouble extraction circuit 134 receives input of the information on a circuit component used in a use state similar to the use state of the circuit component from the similarity determination circuit 133, the trouble extraction circuit 134 refers to the circuit design trouble information DB124 and determines whether or not there is information on a trouble with a circuit component used in a use state similar to the use state of the received input circuit component.

If the trouble extraction circuit 134 determines that there is information on a trouble, the trouble extraction circuit 134 outputs the information on the trouble with the extracted circuit component from the circuit design trouble information DB124 to the result output circuit 135. If the information on, for example, a trouble detection method, trouble countermeasures, a substitute, and the like is stored, for example, in the circuit design trouble information DB124, the trouble extraction circuit 134 extracts these pieces of information as the information on the trouble. Also, if the trouble extraction circuit 134 determines that there is no information on a trouble, the trouble extraction circuit 134 outputs information indicating that there are no hits of information on troubles to the result output circuit 135.

Next, the result output circuit 135 outputs information on a trouble search result to one of the user terminals 10. The result output circuit 135 generates information to be transmitted to the one of the user terminals 10 using the information on the trouble with a circuit component or information indicating that there are no hits of information on the trouble, which is input from the trouble extraction circuit 134, and transmits the information to the one of the user terminals 10 via the communication circuit 111. In this regard, the result output circuit 135 is an example of the output circuit.

Figure 6:
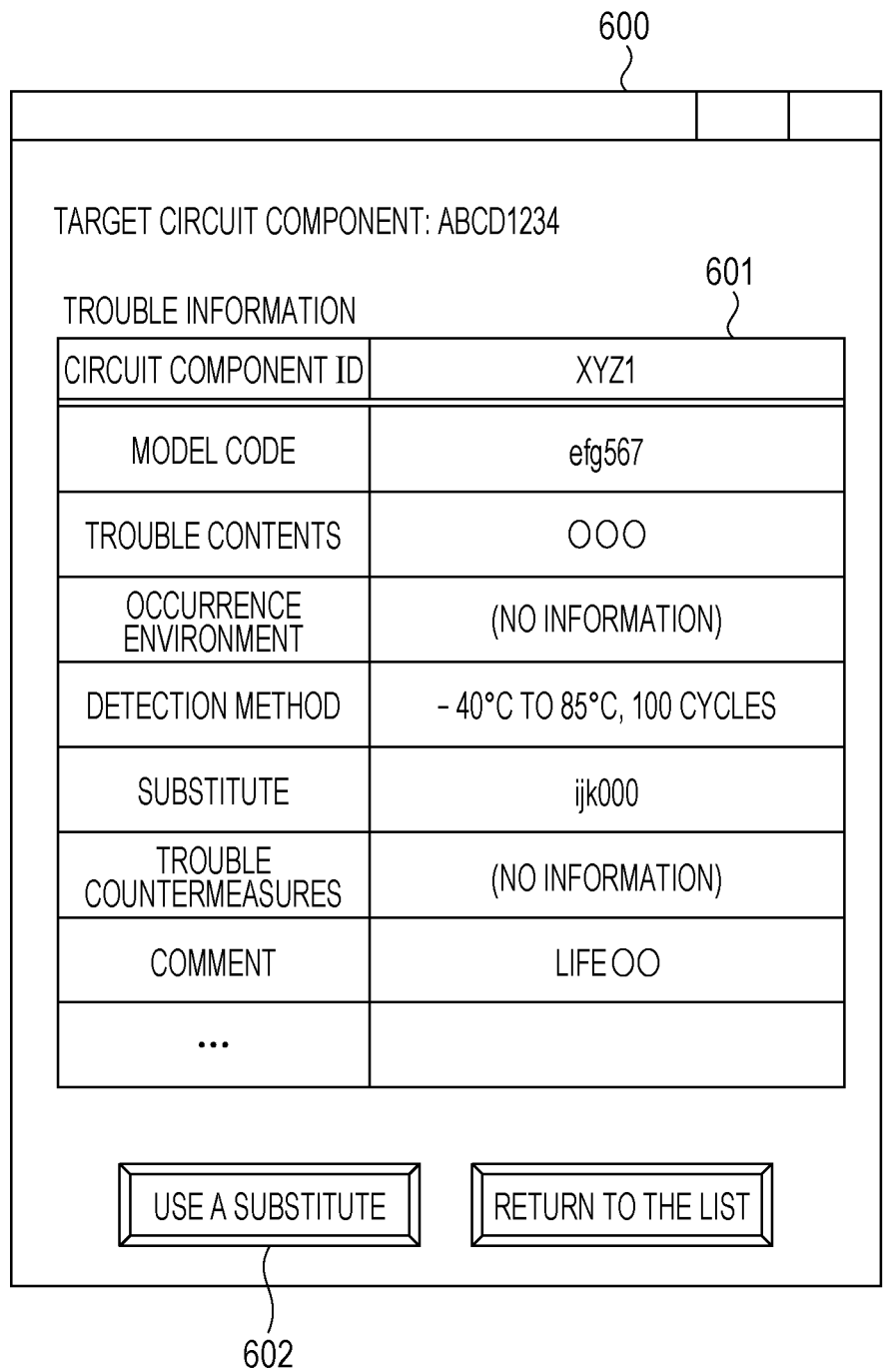
FIG. 6 is a diagram illustrating an example of a result display screen according to the first embodiment.

A description will be given of an example of a result display screen output by the result output circuit 135 with reference to FIG. 6. FIG. 6 is a diagram illustrating an example of a result display screen according to the first embodiment. As illustrated in FIG. 6, the result display screen 600 displays information on a trouble 601 in the use conditions of the circuit component extracted for a circuit component similar to the target circuit component. In the result display screen 600 illustrated in FIG. 6, if a "use a substitute" button 602 is selected, a substitute specified in the information on the trouble of the circuit component is used in place of the target circuit component. A description will be given of the configuration of using a substitute. In this regard, a description has been given of the screen for displaying information on a trouble in the use conditions of a circuit component in FIG. 6. The result output circuit 135 displays the same screen as that in FIG. 6 for the circuit component specific information on a trouble.

Next, the learning circuit 139 updates the registration-time learning model 128 and the use-time learning model 129 using the information on the circuit component and the information on the use state of the circuit component. The learning circuit 139 receives information on the circuit component, information on the type of the circuit component, or information on a circuit component similar to the circuit component, for example, from one of the user terminals 10 via the communication circuit 111. The learning circuit 139 registers or updates the registration-time learning model 128 by a machine learning method with a publicly known teacher using the received information. The learning circuit 139 registers or updates a weighted value of the detailed information, for example, a model code of a circuit component, outer dimensions, electrical characteristics, design and manufacturing information, and the like as a registration-time learning model 128.

Also, the learning circuit 139 receives information on the use state of the circuit component, and information on the type of the use state of the circuit component or information on the use state similar to the use state of the circuit component, for example, from one of the user terminals 10 via the communication circuit 111. The learning circuit 139 registers or updates the use-time learning model 129, for example, by a machine learning method with a publicly known teacher using the received information. The learning circuit 139 registers or updates, for example, a weighted value of the use environment and the use conditions as the use-time learning model 129.

Processing Flow

Figure 7:
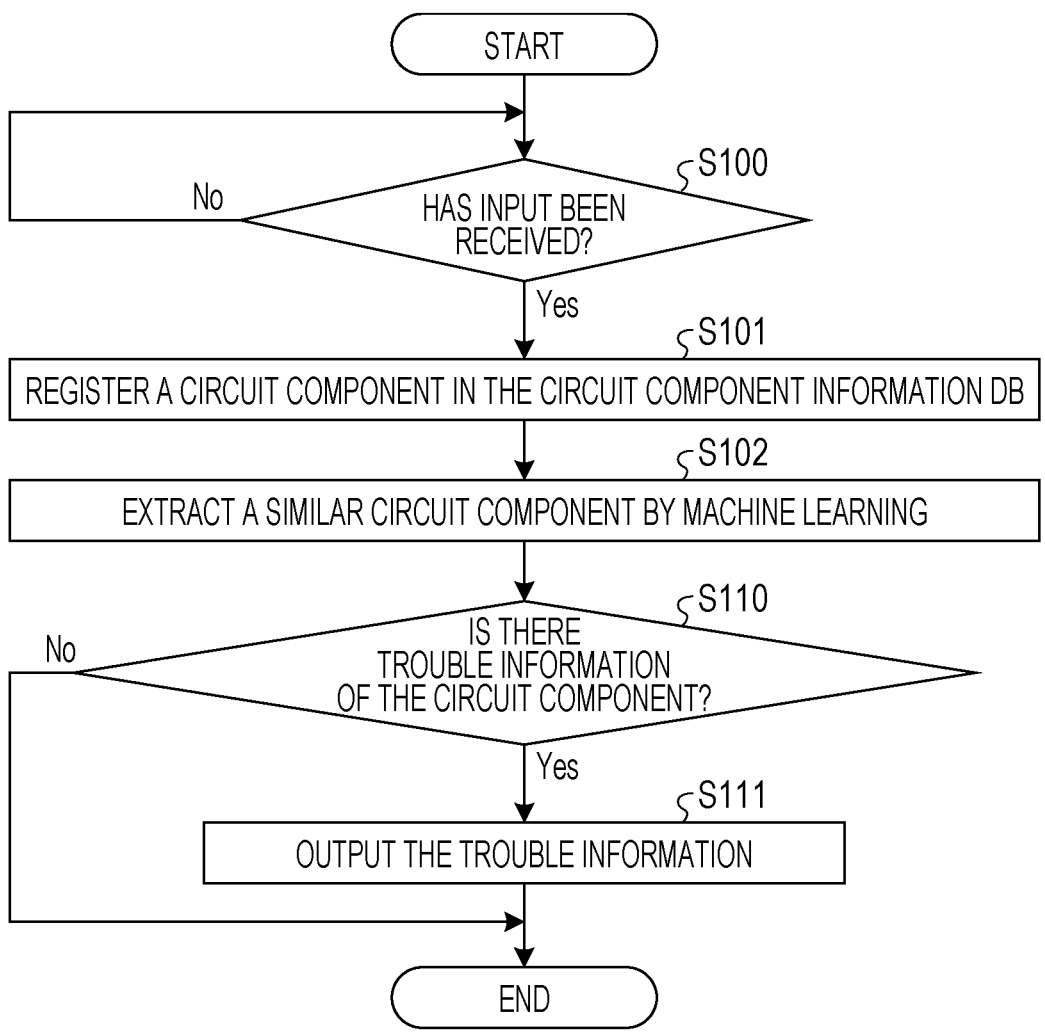
FIG. 7 is a flowchart illustrating an example of registration time processing according to the first embodiment.
Figure 8:
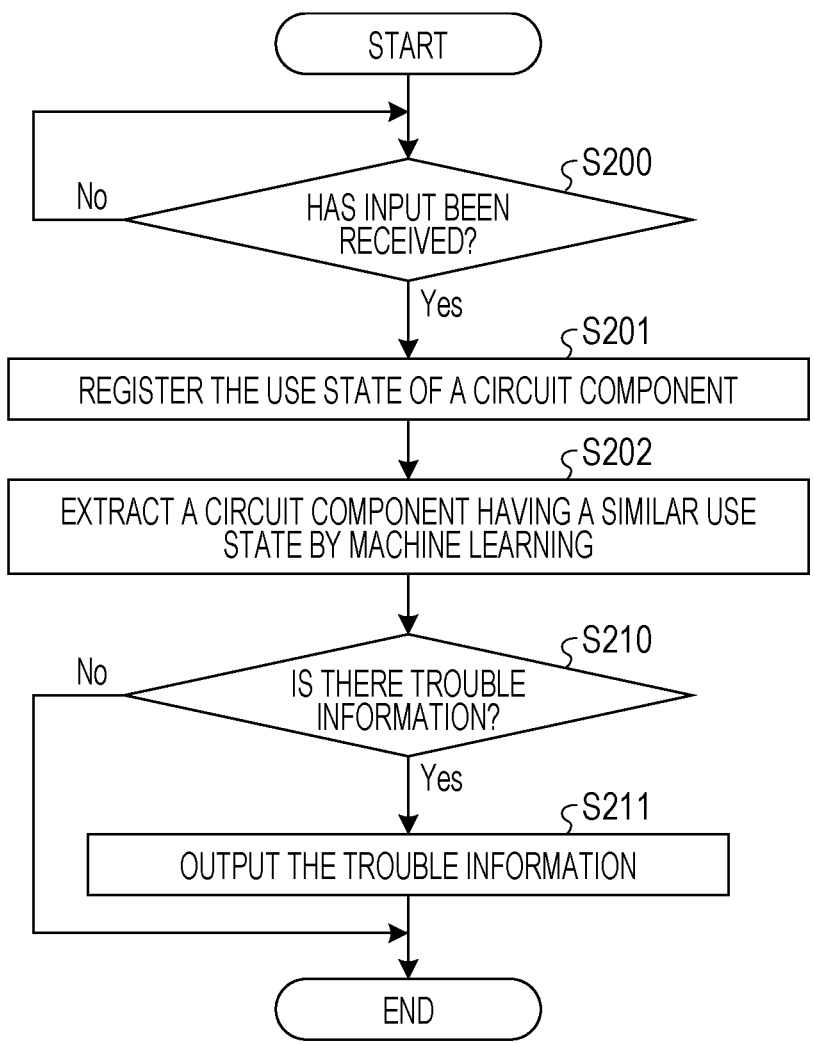
FIG. 8 is a flowchart illustrating an example of design time processing according to the first embodiment.

Next, a description will be given of the processing according to the present embodiment with reference to FIG. 7 and FIG. 8. FIG. 7 is a flowchart illustrating an example of registration time processing according to the first embodiment. As illustrated in FIG. 7, the registration reception circuit 131 of the trouble information search apparatus 100 waits for reception of information on a circuit component to be registered, for example, from one of the user terminals 10 via the communication circuit 111 (S100: No).

If the registration reception circuit 131 determines that information on a circuit component to be registered has been received (S100: Yes), the registration reception circuit 131 outputs the information on the circuit component to the similarity determination circuit 133 and registers the information on the circuit component in the circuit component information DB121 (S101). Next, the similarity determination circuit 133 extracts a circuit component similar to the received circuit component using the registration-time learning model 128 (S102). The similarity determination circuit 133 then outputs the information on the received circuit component and the information on a circuit component similar to the received circuit component to the trouble extraction circuit 134.

Next, the trouble extraction circuit 134 refers to the circuit component trouble information DB123 and determines whether or not trouble information on the received circuit component or a circuit component similar to a received circuit component is registered (S110). If the trouble extraction circuit 134 determines that no trouble information is registered for any of the circuit components (S110: No), the trouble extraction circuit 134 terminates the processing.

On the other hand, if the trouble extraction circuit 134 determines that trouble information on the received circuit component or a circuit component similar to the received circuit component is registered (S110: Yes), the trouble extraction circuit 134 outputs the trouble information to the result output circuit 135. The result output circuit 135 then outputs the trouble information to the one of the user terminals 10 via the communication circuit 111 (S111) and terminates the processing.

Next, a description will be given of the processing when a user carries out design using the registered circuit components. FIG. 8 is a flowchart illustrating an example of design time processing according to the first embodiment. As illustrated in FIG. 8, the design reception circuit 132 of the trouble information search apparatus 100 waits for reception of information on a circuit component, for example, from one of the user terminals 10 via the communication circuit 111 (S200: No).

If the design reception circuit 132 determines that information on a circuit component to be used has been received (S200: Yes), the design reception circuit 132 outputs information on the use state of the circuit component to the similarity determination circuit 133 and registers the information in the circuit component information DB121 and the circuit design information DB122 (S201). Next, the similarity determination circuit 133 extracts a circuit component having the use state similar to that of the received circuit component using the use-time learning model 129 (S202). The similarity determination circuit 133 then outputs the information on the received circuit component and the information on a circuit component having the use state similar to that of the received circuit component to the trouble extraction circuit 134.

Next, the trouble extraction circuit 134 refers to the circuit design trouble information DB124 and determines whether or not trouble information on the received circuit component or the circuit component having the use state similar to that of the received circuit component is registered (S210). If the trouble extraction circuit 134 determines that no trouble information is registered for any of the circuit components (S210: No), the trouble extraction circuit 134 terminates the processing.

On the other hand, if the trouble extraction circuit 134 determines that trouble information on the received circuit component or on a circuit component having the use state similar to that of the received circuit component is registered (S210: Yes), the trouble extraction circuit 134 outputs the trouble information to the result output circuit 135. The result output circuit 135 then outputs the trouble information to the one of the user terminals 10 via the communication circuit 111 (S211), and terminates the processing.

Advantages

As described above, the trouble information search apparatus according to the present embodiment receives input of the information on a circuit component and the information on the use state of the circuit component, and identifies information on a trouble that has occurred with a circuit component having the detailed information similar to that of the circuit component and a circuit component having the use state similar to that of the circuit component. Also, the trouble information search apparatus according to the present embodiment outputs the identified information on the trouble. Thereby, it is possible to extract the information on the trouble.

Second Embodiment

In the above, the description has been given of the embodiment of the present disclosure. However, the present disclosure may be carried out in various different modes other than the embodiment described above. For example, in the first embodiment, the configuration in which the model code of a circuit component is input when making a search for a circuit component. However, the present disclosure is not limited to this. For example, the design reception circuit 132 may receive input of the conditions regarding the specifications of a circuit component, or the like, and the similarity determination circuit 133 may search for a circuit component to be used in the use state similar to the use state of the circuit component having the matched conditions.

Also, a search may be made such that a plurality of circuit components described in a circuit components list, a circuit diagram, an implementation diagram, or the like may be targeted rather than a single circuit component. FIG. 9 is a diagram illustrating an example of a circuit components list. FIG. 9 is, for example, a circuit components list that indicates a list of circuit components used for one circuit. A circuit components list illustrated in FIG. 9 includes a record including "circuit component name" indicating the name of a circuit component, "number of pieces" indicating the number of pieces of the circuit components used in the circuit, and "model code, or the like" indicating a circuit component model, capacitance, resistance, or the like in association with each other.

When a trouble information search apparatus 200 according to the present embodiment receives input of the circuit components list at the time of designing a circuit, or the like, the trouble information search apparatus 200 extracts a model code, or the like described in the circuit components list. The trouble information search apparatus 200 then repeats the design time processing as illustrated in FIG. 8 for each extracted model code. In this regard, the illustration of the trouble information search apparatus 200 is omitted.

Figure 10:
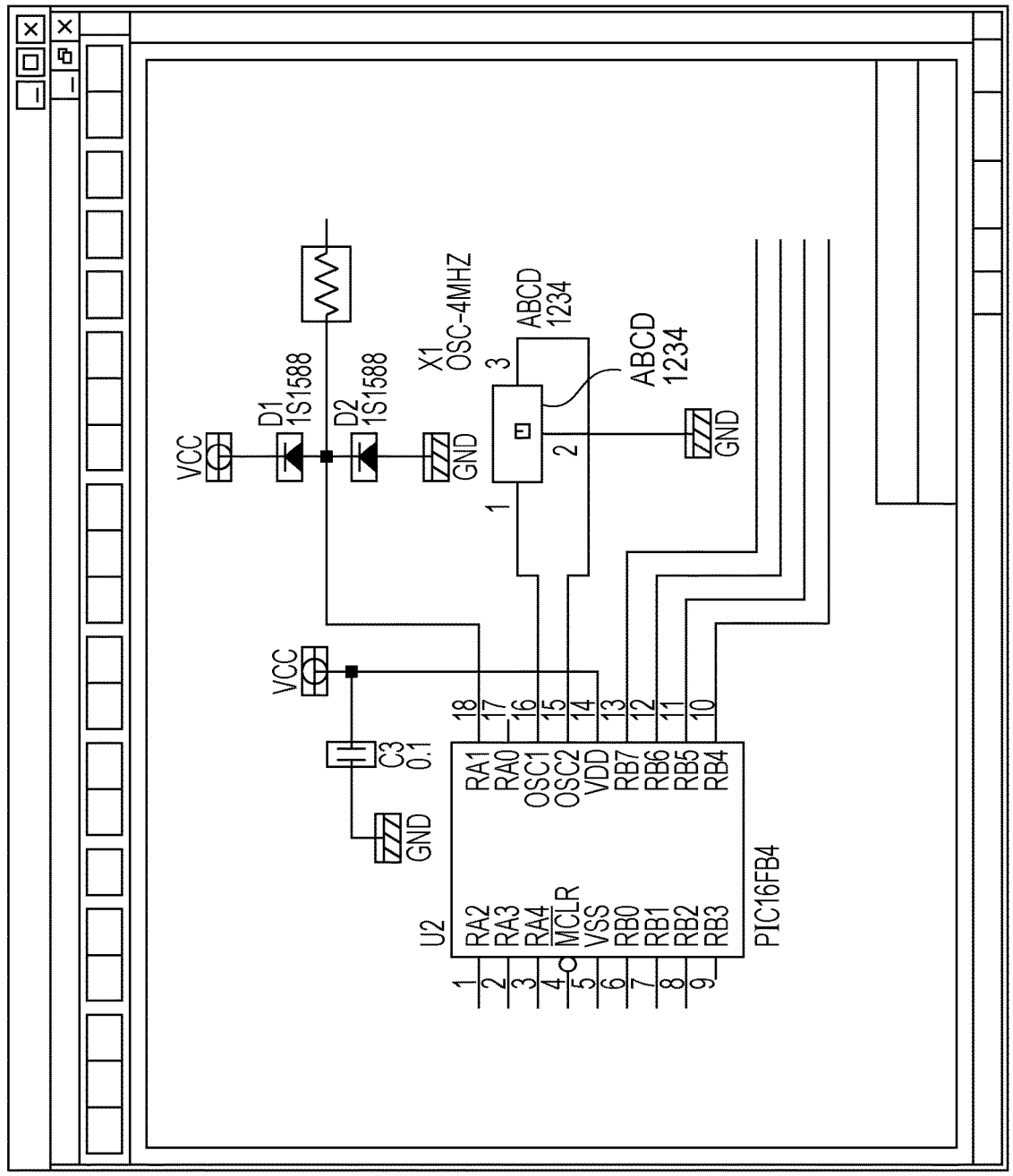
FIG. 10 is a diagram illustrating an example of a circuit diagram.
Figure 11:
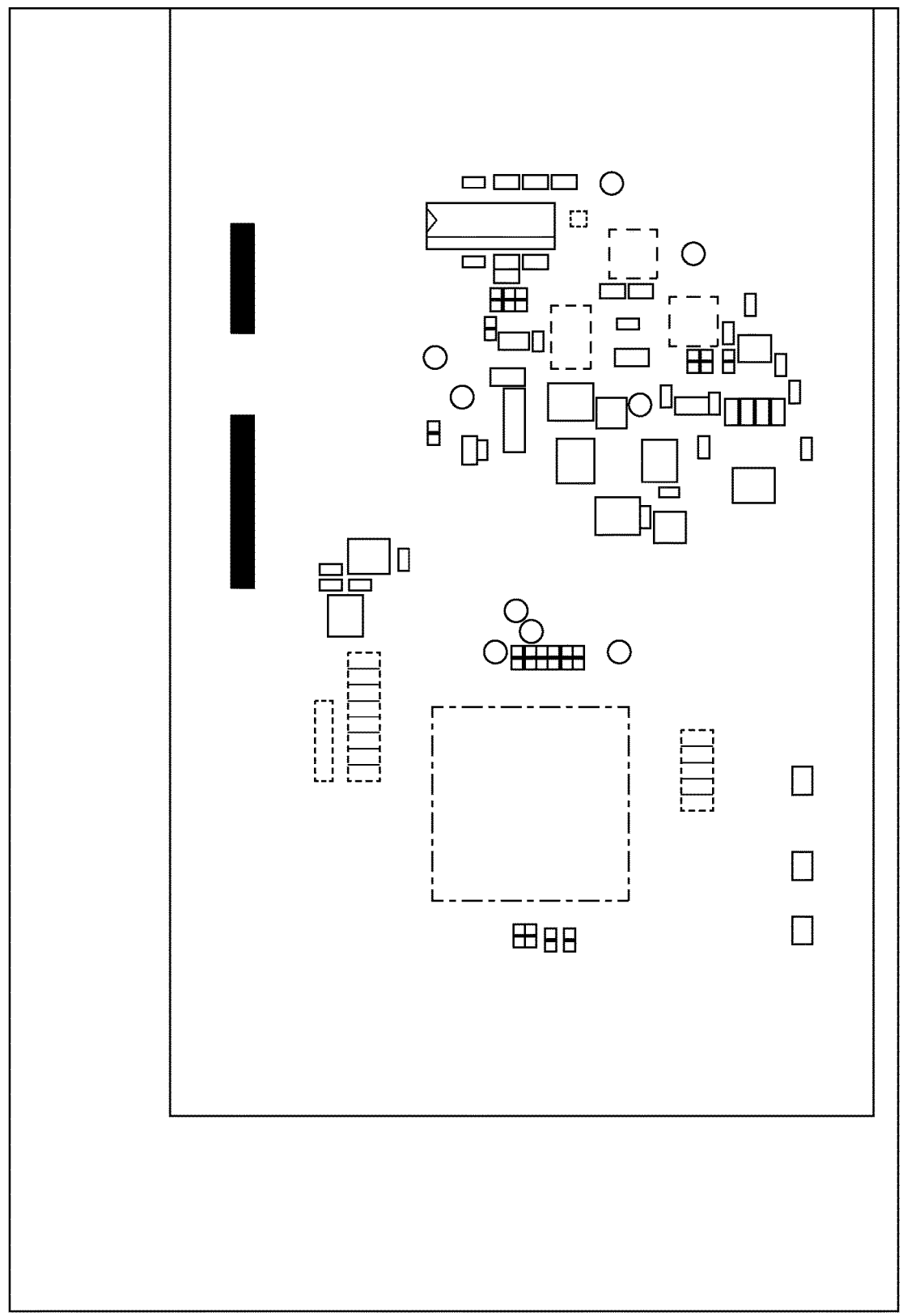
FIG. 11 is a diagram illustrating an example of an implementation diagram.

Also, the trouble information search apparatus 200 according to the present embodiment may receive input of not only a circuit components list but also a circuit diagram, an implementation diagram, or the like. FIG. 10 is a diagram illustrating an example of a circuit diagram. Also, FIG. 11 is a diagram illustrating an example of an implementation diagram. When the trouble information search apparatus 200 according to the embodiment receives input of, for example, the circuit diagram illustrated in FIG. 10 or the implementation diagram illustrated in FIG. 11, the trouble information search apparatus 200 recognizes a model code, or the like described in the circuit diagram or the implementation diagram. The trouble information search apparatus 200 receives image data of a circuit diagram or an implementation diagram by, for example, a scanner, or the like, not illustrated in the figure, and recognizes a model code, or the like using a publicly-known optical character recognition (OCR) technology. For example, the trouble information search apparatus 200 recognizes a model code, such as "ABCD1234" displayed in the circuit diagram illustrated in FIG. 10, or the like. The trouble information search apparatus 200 then repeats the design time processing as illustrated in FIG. 8 for each recognized model code.

In this manner, by receiving input of a circuit components list, a circuit diagram, an implementation diagram, or the like and performing design time processing, it is possible for the trouble information search apparatus 200 according to the present embodiment to extract information on troubles with a plurality of circuit components to be used at the same time all at one time.

In this case, the trouble information search apparatus 200 may refer to the circuit design information DB 122 and may identify a received input circuit components list, a circuit components list similar to a circuit diagram, an implementation diagram, or the like. The trouble information search apparatus 200 may then further identify a trouble that has occurred with a circuit component included in a circuit diagram or an implementation diagram, or the like. Thereby, it is possible to more comprehensively present a trouble that might occur in the use state of the received input circuit components list, circuit diagram or implementation diagram, or the like to a user.

Figure 12:
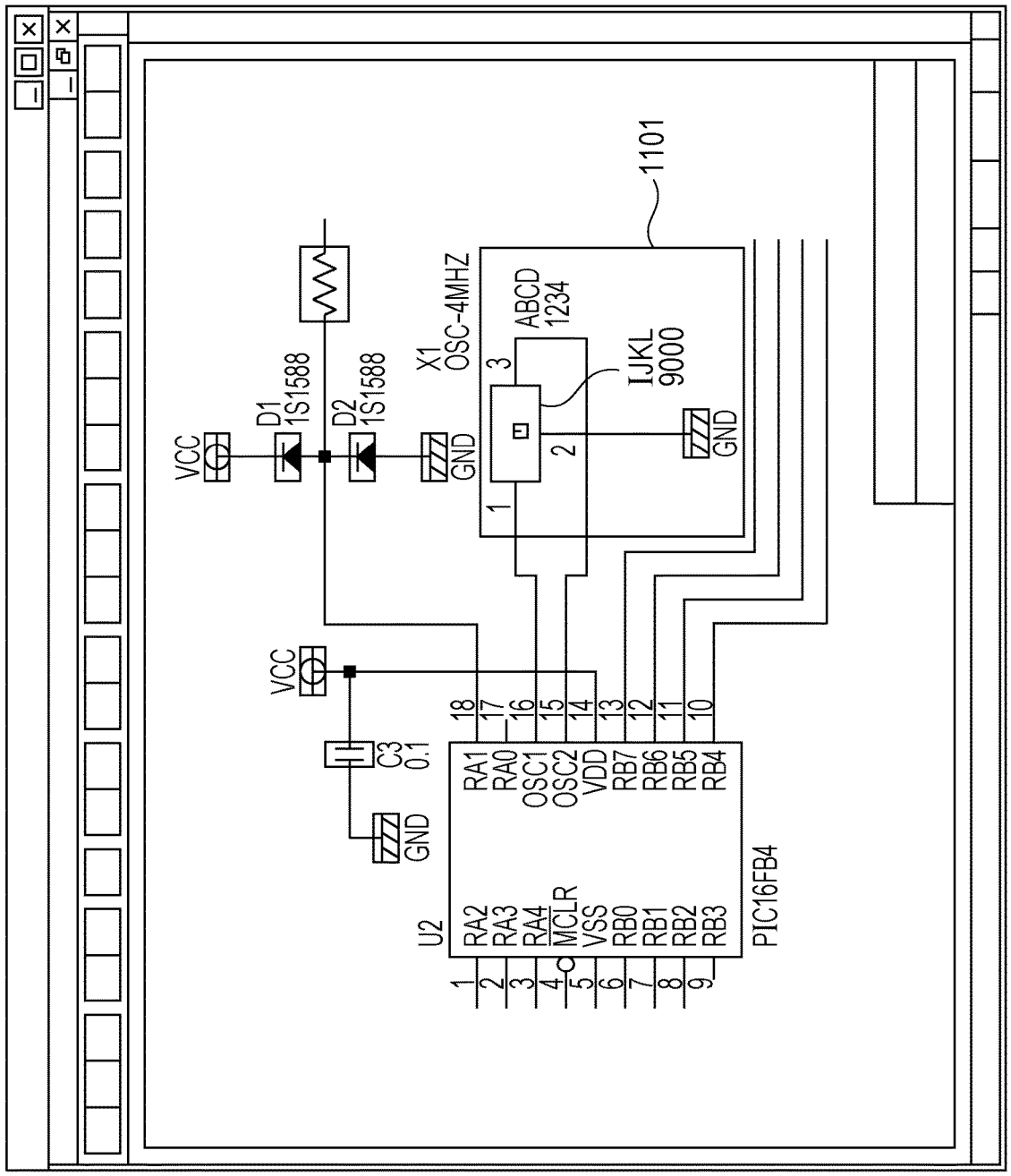
FIG. 12 is a diagram illustrating an example of a circuit diagram having been rewritten with substitute information according to a second embodiment.

Also, when the trouble information search apparatus 200 has received input of a circuit components list, a circuit diagram, an implementation diagram, or the like, and has presented information of a substitute of a circuit component having a trouble, the trouble information search apparatus 200 may update the input circuit components list, the circuit diagram, the implementation diagram, or the like using the information on the substitute selected by a user. FIG. 12 is a diagram illustrating an example of a circuit diagram rewritten with substitute information according to the second embodiment. In the circuit diagram illustrated in FIG. 12, as illustrated by a sign 1101, the model "ABCD1234" of the quartz oscillator in the circuit diagram illustrated in FIG. 10 is replaced with a substitute model "IJKL9000". Thereby, it is possible to easily present a substitute example of a circuit component having a trouble to a user.

Also, the trouble information search apparatus 200 may further identify the troubles that have occurred with a circuit component having similar characteristics, an outer shape, and the like as those of the received input circuit component in addition to the troubles that have occurred with a circuit component having the use state similar to that of the received input circuit component. Thereby, it is possible to more comprehensively present troubles that might occur with the received input circuit component to a user.

System

Also, among each processing described in each of the embodiments, it is possible to manually perform all of or a circuit component of the processing that has been described as automatically performed. Alternatively, it is possible to automatically perform, by a publicly known method, all of or a circuit component of the processing that has been described as manually performed. In addition, it is possible to change information including processing procedures, control procedures, specific names, various kinds of data and parameters illustrated in the above-described documents and the drawings in any way unless otherwise specified.

Also, each circuit component of each device illustrated in the figures is conceptually functional and does not have to be physically configured as described in the figures. That is to say, the specific mode of distribution and integration of each device is not limited to that illustrated in the figures. That is to say, it is possible to configure each device by functionally or physically distributing or integrating all of or a circuit component of the device in any units depending on various loads and use states, and the like. For example, the registration reception circuit 131 and the design reception circuit 132 illustrated in FIG. 1 may be integrated. Also, the registration reception circuit 131 illustrated in FIG. 1 may be distributed into a circuit component registration reception circuit and a trouble registration reception circuit. Further, it is possible to realize all of or any circuit component of each processing function performed by each device using a CPU and programs that are analyzed and executed by the CPU. Alternatively, each processing function may be realized as hardware by wired logic.

Trouble Information Search Program

Figure 13:
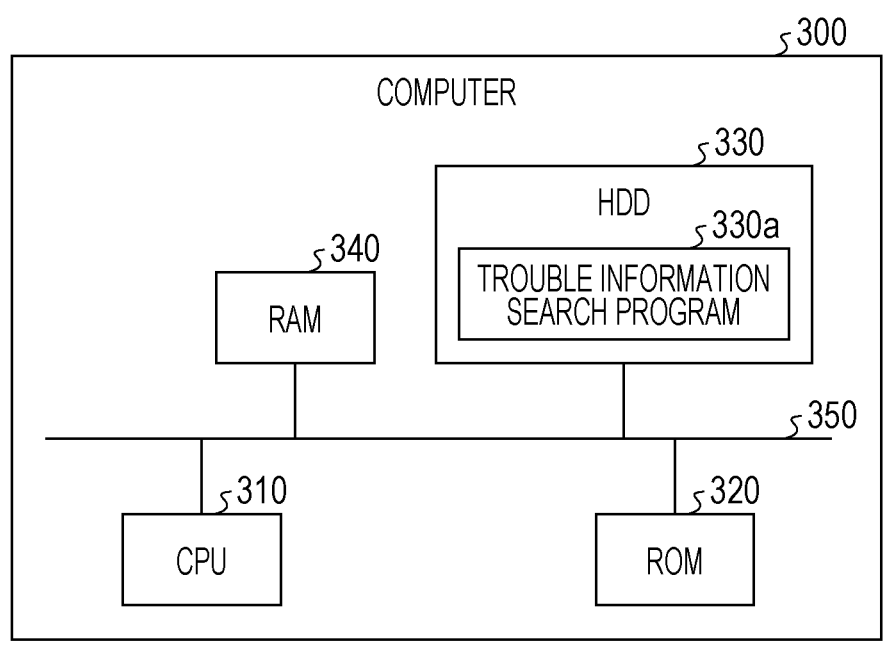
FIG. 13 is a diagram illustrating a computer that executes a trouble information search program.

Also, it is possible to realize the various kinds of processing of the trouble information search apparatuses 100 and 200 described in the embodiments by executing programs provided in advance by a computer system, such as a personal computer, a workstation, or the like. Thus, in the following, a description will be given of an example of a computer that executes a trouble information search program having the same functions as those of the trouble information search apparatuses 100 and 200 with reference to FIG. 13. FIG. 13 is a diagram illustrating a computer that executes the trouble information search program.

As illustrated in FIG. 13, a computer 300 includes a CPU 310, a ROM 320, an HDD 330, and a RAM 340. These devices 310 to 340 are connected via a bus 350.

The ROM 320 stores a basic program, such as an operating system (OS), or the like. Also, the HDD 330 stores a trouble information search program 330a having the same functions as those of the registration reception circuit 131, the design reception circuit 132, the similarity determination circuit 133, the trouble extraction circuit 134, the result output circuit 135, and the learning circuit 139 described in the first embodiment in advance. Also, the trouble information search program 330a may be suitably separated. Also, the HDD 330 is provided with various kinds of data and various tables that are stored in the memory 120.

The CPU 310 then reads the trouble information search program 330a from the HDD 330 and executes the program.

The CPU 310 then reads the various kinds of data and the various tables and stores them in the RAM 340. Further, the CPU 310 executes the trouble information search program 330a using the various kinds of data and the various tables stored in the RAM 340. In this regard, all of the data to be stored in the RAM 340 may not be stored in the RAM 340 all the time. The data used for the processing ought to be stored in the RAM 340.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A trouble information search method comprising:
storing plural pieces of first information and a corresponding trouble report, each of the plural pieces of first information indicating a first circuit component, the first circuit component being a circuit component associated with the corresponding trouble report indicating a trouble occurred in the circuit component;
in response to a user input to select a second circuit component during performing a circuit design, receiving second information indicating the second circuit component, the second circuit component being a circuit component other than the first circuit component indicated by each of the plural pieces of first information;
selecting, in accordance with similarity degree between the second circuit component indicated by the received second information and the first circuit component indicated by each of the plural pieces of first information, first information from among the plural pieces of first information, the selected first information including a parameter similar with a parameter included in the received second information;
obtaining the stored trouble report associated with the selected first information; and
outputting, in association with the second circuit component, information on the trouble indicated by the obtained trouble report and the first circuit component indicated by the selected first information.

2. The trouble information search method according to claim 1, wherein the second information includes design and manufacturing information of the second circuit component.

3. The trouble information search method according to claim 1, wherein
the trouble report includes third information for detecting or avoiding an occurrence of the trouble, or fourth information on a method of avoiding an occurrence of the trouble, or a combination thereof,
the outputting of the information on the trouble includes outputting, based on the trouble report associated with the selected first information, at least any one of the third information, the fourth information, and the combination thereof.

4. The trouble information search method according to claim 1, wherein
the trouble report includes fifth information on a substitute for the second circuit component,
the outputting of the information on the trouble includes outputting, based on the trouble report associated with the selected first information, the substitute for the second circuit component indicated by the fifth information included in the associated trouble report.

5. The trouble information search method according to claim 1, wherein
the first information includes information on a use state of the first circuit component,
the second information includes information on a use state of the second circuit information,
the selecting of the first information includes obtaining, by using machine learning with the plural pieces of first information and the second information, the similarity degree between the information on the use state of the first circuit component and the information on the use state of the second circuit component.

6. The trouble information search method according to claim 5, wherein
the first information includes a first parameter for the first circuit component, the first parameter including a model code of the first circuit component, outer dimensions, electrical characteristics, design and manufacturing information, a use environment, or use conditions, or any combination thereof,
the second information includes a second parameter for the second circuit component, the second parameter including a model code of the second circuit component, outer dimensions, electrical characteristics, design and manufacture information, a use environment, or use conditions, or any combination thereof,
the selecting of the information on the trouble includes:
obtaining, based on the first information, a first total value of weighted value of the first parameter;
obtaining, based on the second information, a second total value of weighted value of the second parameter; and
selecting the first information from among the plural pieces of first information, the selected first information including the first parameter of which the first total value is similar with the second total value.

7. The trouble information search method according to claim 1, wherein the receiving of the second information is performed at registration time of the circuit component or at design time of a product using the circuit component.

8. The trouble information search method according to claim 1, wherein the receiving of the second information includes receiving information on a circuit components list, a circuit diagram, or an implementation diagram, and
the outputting is outputting information on the trouble occurred with the first circuit component used in a similar circuit design.

9. The trouble information search method according to claim 4, further comprising when input of a circuit components list, a circuit diagram, or an implementation diagram is received, and selection of the substitute is further received, updating the circuit components list, the circuit diagram, or the implementation diagram using information on the selected substitute.

10. A trouble information search apparatus comprising:
a memory configured to store plural pieces of first information and a corresponding trouble report, each of the plural pieces of first information indicating a first circuit component, the first circuit component being a circuit component associated with the corresponding trouble report indicating a trouble occurred in the circuit component;
a processor coupled to the memory, the processor being configured to execute a process, the process comprising:

in response to a user input to select a second circuit component during performing a circuit design, receiving second information indicating the second circuit component, the second circuit component being a circuit component other than the first circuit component indicated by each of the plural pieces of first information;

selecting, in accordance with similarity degree between the second circuit component indicated by the received second information and the first circuit component indicated by each of the plural pieces of first information, first information from among the plural pieces of first information, the selected first information including a parameter similar with a parameter included in the received second information;

obtaining the stored trouble report associated with the selected first information; and outputting, in association with the second circuit component, information on the trouble indicated by the obtained trouble report and the first circuit component indicated by the selected first information.

11. A computer-readable non-transitory recording medium having stored a program that causes a computer to execute a process, the process comprising:

establishing a connection to a storage device configured to store plural pieces of first information and a corresponding trouble report, each of the plural pieces of first information indicating a first circuit component, the first circuit component being a circuit component associated with the corresponding trouble report indicating a trouble occurred in the circuit component;

in response to a user input to select a second circuit component during performing a circuit design, receiving second information indicating the second circuit component, the second circuit component being a circuit component other than the first circuit component indicated by each of the plural pieces of first information;

selecting, in accordance with similarity degree between the second circuit component indicated by the received second information and the first circuit component indicated by each of the plural pieces of first information, first information from among the plural pieces of first information, the selected first information including a parameter similar with a parameter included in the received second information;

obtaining the stored trouble report associated with the selected first information; and outputting, in association with the second circuit component, information on the trouble indicated by the obtained trouble report and the first circuit component indicated by the selected first information.

12. The computer-readable non-transitory recording medium according to claim 11, wherein the second information includes design and manufacturing information of the second circuit component.

13. The computer-readable non-transitory recording medium according to claim 11, wherein the trouble report includes third information for detecting or avoiding an occurrence of the trouble, or fourth information on a method of avoiding an occurrence of the trouble, or a combination thereof, the outputting of the information on the trouble includes outputting, based on the trouble report associated with the selected first information, at least any one of the third information, the fourth information, and the combination thereof.

14. The computer-readable non-transitory recording medium according to claim 11, wherein the trouble report includes fifth information on a substitute for the second circuit component, the outputting of the information on the trouble includes outputting, based on the trouble report associated with the selected first information, the substitute for the second circuit component indicated by the fifth information included in the associated trouble report.

15. The computer-readable non-transitory recording medium according to claim 11, wherein the first information includes information on a use state of the first circuit component, the second information includes information on a use state of the second circuit information, the selecting of the first information includes obtaining, by using machine learning with the plural pieces of first information and the second information, the similarity degree between the information on the use state of the first circuit component and the information on the use state of the second circuit component.

16. The computer-readable non-transitory recording medium according to claim 15, wherein the first information includes a first parameter for the first circuit component, the first parameter including a model code of the first circuit component, outer dimensions, electrical characteristics, design and manufacturing information, a use environment, or use conditions, or any combination thereof, the second information includes a second parameter for the second circuit component, the second parameter including a model code of the second circuit component, outer dimensions, electrical characteristics, design and manufacture information, a use environment, or use conditions, or any combination thereof, the selecting of the first information include:

obtaining, based on the first information, a first total value of weighted value of the first parameter;

obtaining, based on the second information, a second total value of weighted value of the second parameter; and selecting the first information from among the plural pieces of first information, the selected first information including the first parameter of which the first total value is similar with the second total value.

17. The computer-readable non-transitory recording medium according to claim 11, wherein the receiving of the second information is performed at registration time of the circuit component or at design time of a product using the circuit component.

18. The computer-readable non-transitory recording medium according to claim 11, wherein the receiving of the second information includes receiving information on a circuit components list, a circuit diagram, or an implementation diagram, and the outputting is outputting information on the trouble occurred with the first circuit component used in a similar circuit design.

19. The computer-readable non-transitory recording medium according to claim 14, further comprising when input of a circuit components list, a circuit diagram, or an implementation diagram is received, and selection of the substitute is further received, updating the circuit components list, the circuit diagram, or the implementation diagram using information on the selected substitute.

* * * * *